US012109721B2

(12) United States Patent
Dumoulin et al.

(10) Patent No.: US 12,109,721 B2
(45) Date of Patent: Oct. 8, 2024

(54) YARN CLEARER AND CUTTING DEVICE FOR A YARN CLEARER

(71) Applicant: Saurer Intelligent Technology AG, Arbon (CH)

(72) Inventors: Charles Leopold Elisabeth Dumoulin, Balgach (CH); Kalidass Santhoshkumar, Coimbatore (IN); Ilir Adili, Widnau (CH)

(73) Assignee: Saurer Intelligent Technology AG, Arbon (CH)

( * ) Notice: Subject to any disclaimer, the term of this patent is extended or adjusted under 35 U.S.C. 154(b) by 56 days.

(21) Appl. No.: 17/981,057

(22) Filed: Nov. 4, 2022

(65) Prior Publication Data

US 2023/0139021 A1 May 4, 2023

(30) Foreign Application Priority Data

Nov. 4, 2021 (EP) .................................... 21206555

(51) Int. Cl.
*B26D 7/20* (2006.01)
*B26D 7/26* (2006.01)
*D02J 3/02* (2006.01)

(52) U.S. Cl.
CPC ............. *B26D 7/20* (2013.01); *B26D 7/2628* (2013.01); *D02J 3/02* (2013.01)

(58) Field of Classification Search
CPC ...... D02J 3/02; D02J 7/00; B26D 7/20; B26D 7/202; B26D 7/204; B26D 1/04; B26D 1/045; B26D 1/08; B26D 1/085; B26D 5/086; B26D 5/08; B26D 1/06;
(Continued)

(56) References Cited

U.S. PATENT DOCUMENTS 1,617,801 A * 2/1927 Frick ........................ B26D 7/20
269/294
2,624,933 A * 1/1953 Quick .................. B65H 63/061
28/235
(Continued)

FOREIGN PATENT DOCUMENTS

DE 1785157 B1 7/1971

*Primary Examiner* — Amy Vanatta
(74) *Attorney, Agent, or Firm* — Fox Rothschild LLP

(57) ABSTRACT

The present invention relates to a yarn clearer for a workstation of a textile machine with a cutting device for clearing out defects from a yarn, as well as a cutting device for a yarn clearer which is configured to be arranged on a workstation of a textile machine, with a cutting knife with a cutting edge adjustable between a rest position and a cutting position, and an anvil arranged on an anvil carrier in an operating position in which a stop surface of the anvil interacts with the cutting edge of the cutting knife in the cutting position. In order to provide a yarn clearer with a cutting device as well as a cutting device with a cutting knife and an anvil, which is characterised by a long service life, there is provision for the anvil to have at least two stop surfaces which are configured to be arranged on the anvil carrier in the operating position and is adjustably arranged on the anvil carrier for the selection of the stop surface which is configured to be brought into an active connection with the cutting edge.

15 Claims, 1 Drawing Sheet

(58) Field of Classification Search
CPC .... B26D 1/065; B26D 7/0006; B26D 7/2628; B65H 54/71; B65H 2701/31; D06H 7/02
USPC .......................................... 28/222, 226, 223
See application file for complete search history.

(56) References Cited

U.S. PATENT DOCUMENTS

| | | | | | |
|---|---|---|---|---|---|
| 2,649,911 | A * | 8/1953 | Cole | C14B 5/02 | 106/124.62 |
| 2,654,938 | A * | 10/1953 | Kennedy | B65H 63/061 | 28/235 |
| 2,680,484 | A * | 6/1954 | Stuck | B26D 7/20 | 83/648 |
| 2,691,810 | A * | 10/1954 | Goodhue | B65H 63/061 | 28/229 |
| 3,182,541 | A | 5/1965 | Nutting et al. | | |
| 3,264,921 | A * | 8/1966 | Nystrand | B26F 1/20 | 83/342 |
| 3,322,013 | A * | 5/1967 | Felix | B65H 54/71 | 83/575 |
| 3,554,068 | A | 1/1971 | Schwartz | | |
| 3,854,356 | A * | 12/1974 | Okreglak | B26D 5/26 | 83/370 |
| 4,051,756 | A * | 10/1977 | Bognar | B65H 54/71 | 83/567 |
| 4,363,453 | A * | 12/1982 | Hill | B02C 18/144 | 241/242 |
| 5,211,709 | A * | 5/1993 | Hussey | B65H 63/036 | 242/487.7 |
| 5,709,143 | A * | 1/1998 | Bentley | A01F 15/141 | 83/346 |
| 6,637,490 | B1 * | 10/2003 | Azulay | D06H 7/223 | 156/580.2 |
| 2013/0192436 | A1 * | 8/2013 | Barea | B65H 54/71 | 83/79 |

* cited by examiner

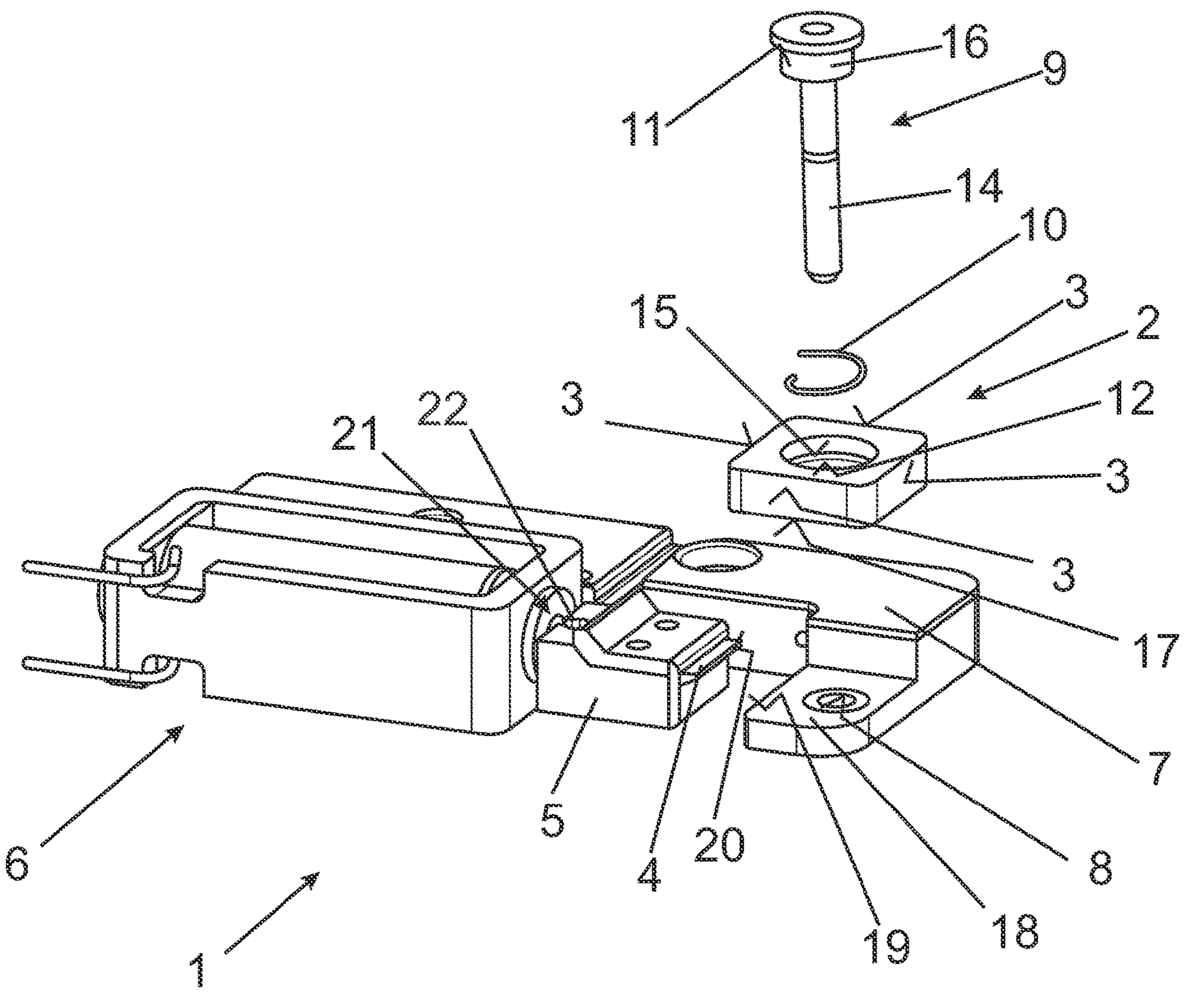
16
9
11
14
10
15
3
2
3
12
22
21
3
3
17
7
5
4
20
8
6
19
18
1

YARN CLEARER AND CUTTING DEVICE FOR A YARN CLEARER

CROSS REFERENCE TO RELATED APPLICATIONS

This application claims, under 35 U.S.C. § 119(a), the benefit of European Patent Application No. EP21206555.1, filed on Nov. 4, 2021, the disclosure of which is incorporated herein by reference in its entirety.

The present invention relates to a cutting device for a yarn clearer which is configured to be arranged at a workstation of a textile machine, having a cutting knife with a cutting edge that can be adjusted between a rest position and a cutting position, and an anvil arranged on an anvil carrier in an operating position in which a stop surface of the anvil interacts with the cutting edge of the cutting knife in the cutting position.

In the manufacture of yarns, the aim is usually to achieve the highest possible yarn uniformity within narrow tolerances and a yarn without defects, especially visible defects, such as intolerable thick or thin places. To achieve this, what are referred to as yarn clearers are used at the individual workstations of a textile machine, which, for example, continuously monitor the diameter of the yarn with a suitable measuring head. If an intolerable defect is detected due to exceeding or falling below the limit values designated as clearing limits, the defect is cut out of the yarn by means of the cutting device of the yarn clearer, the yarn ends are reconnected and the production process is continued.

Cutting devices for yarn clearers of prior art are, for example, electromagnetically actuated, in which case they are configured either in the manner of scissors or in the manner of a chisel as mentioned above, with this design being preferred due to its simpler construction.

A disadvantage of this design, however, is that the service life of the cutting knifes cooperating with anvils is shorter than that of scissor-type cutting devices, since increased wear occurs due to the operation of these cutting devices, in which the blade of the cutting knife strikes the stop surface of the anvil with a predetermined impact force in order to cut the yarn, necessitating regular replacement of the cutting knife or anvil in order to maintain a uniform cutting performance.

On this basis, the problem addressed by the present invention is one of providing a yarn clearer with a cutting device as well as a cutting device with a cutting knife and an anvil, which is characterised by a long service life.

The present invention solves the problem by means of a cutting device having the features of claim 1 and by means of a yarn clearer having the features of claim 11. Advantageous further developments of the present invention are stated in the dependent claims.

A characteristic feature of the cutting device according to the present invention is that the anvil has at least two stop surfaces which are configured to be arranged on the anvil carrier in the operating position, and is adjustably arranged on the anvil carrier for the selection of the stop surface which is configured to be brought into an active connection with the cutting edge.

According to the present invention, at least two stop surfaces separated from one another are formed on the anvil, so that the anvil can be arranged in two positions on the anvil carrier in the operating position, in which one of the stop surfaces, of which there are at least two in each case, interacts with the cutting edge of the cutting knife in the cutting position. Without replacing the anvil, it is thus possible, for example, in the event of excessive wear on the first stop surface, to adjust the anvil relative to the anvil carrier in such a way that in the operating position the second stop surface is then opposite the cutting edge of the cutting knife as a counter-bearing, between which a yarn can be cut if necessary.

In order to select the stop surface that can be brought into an active connection with the cutting edge, there is provision, in accordance with the present invention, for the anvil to be arranged adjustably on the anvil carrier. If necessary, the adjustment possibility makes it easy to select the anvil stop surface opposite the cutting edge from the stop surfaces of the anvil, of which there are at least two. The embodiment of the connection of the anvil to the anvil carrier in such a way that the anvil carrier can optionally be arranged with at least one of the stop surfaces, of which there are at least two, in the operating position is basically freely selectable.

According to a particularly advantageous embodiment of the present invention, there is provision for the anvil to be arranged on the anvil carrier in a detachable manner. Detachable is understood to mean a non-destructive, in particular repeatable, disassembly of the anvil from the anvil carrier. This embodiment of the present invention makes it possible in a particularly simple and convenient manner to align the anvil in such a way that, in the operating position, the desired stop surface interacts with the cutting edge of the cutting knife. For example, if necessary due to wear of the first stop surface, the anvil can be separated from the anvil carrier due to the detachable connection and then aligned and reconnected to the anvil carrier by the operating personnel in such a way that in the operating position the stop surface, which is at least the second such, cooperates with the cutting edge of the cutting knife in the cutting position.

A reliable function of the cutting device as well as long service lives can be achieved in particular by aligning the cutting edge of the cutting knife parallel to the stop surface of the anvil in the cutting position to ensure both uniform loading of the stop surface and the cutting edge as well as a clean cut of a yarn to be severed by the cutting device. According to a further embodiment of the present invention, there is provision for the anvil to be articulated on the anvil carrier in the operating position in such a way that, in the cutting position, the cutting edge aligns the stop surface in a fixed location with respect to the cutting edge, in particular parallel to one another.

According to this embodiment of the present invention, there is provision for the anvil, which is connected to the anvil carrier in the operating position, to be changed in its orientation relative to the cutting knife due to its articulated arrangement on the anvil carrier. Accordingly, after a first assembly of the anvil on the anvil carrier in the operating position, it is thus possible, via a first displacement of the cutting edge from the rest position into the cutting position, to adjust the contact surface with the cutting edge relative to the anvil carrier so that the contact surface is aligned, in particular parallel to the cutting edge. The articulated adjustment of the anvil relative to the anvil carrier enables the cutting edge and the stop surface to be aligned with one another in the cutting position, in particular parallel and further preferably along a complete interacting extension length over which the cutting edge comes into contact with the stop surface in the cutting position, without further means of assistance being required for this purpose.

After the first alignment of the stop surface by the cutting edge of the cutting knife, the anvil then remains in the position set by the cutting knife due to the further articulated embodiment provided, so that the stop surface is aligned in a stationary manner with respect to the cutting edge.

This embodiment of the present invention ensures optimum alignment of the stop surface with respect to the cutting edge in a particularly reliable manner. Angular deviations of the cutting edge relative to the stop surface between the rest position and the cutting positions can thus be compensated automatically by a one-time first displacement of the cutting edge into the cutting position, in which the stop surface is optimally aligned relative to the cutting edge by the cutting edge.

The embodiment of the articulated connection of the anvil carrier to the anvil is basically freely selectable, although it is particularly preferred for the anvil to be connected to the anvil carrier in an articulated manner, in particular for parallel alignment of the stop surface with respect to the cutting edge in the cutting position. A rotary joint in which the stop surfaces, of which there are at least two, are preferably arranged on a circumferential surface of the anvil extending at a distance from the rotary joint axis of the anvil with the anvil carrier allows the stop surface to be aligned in a particularly simple manner, in particular parallel, with respect to the cutting edge, by a rotation about the rotary joint axis. Likewise, a corresponding further embodiment of the present invention permits a simple change of the stop surface, in which case for this purpose the anvil merely has to be rotated about the rotary joint axis until an alternative stop surface is arranged in the operating position opposite to the cutting edge.

The anvil can be fixed in the operating position on the anvil carrier by any means, for example by positive-locking connection elements. According to a particularly advantageous embodiment of the present invention, however, there is provision for the anvil to be frictionally connected to the anvil carrier in the operating position, in particular screwed to the anvil carrier with a defined pretensioning force.

This embodiment of the present invention permits a particularly simple and convenient adjustment of the stop surface of the anvil relative to the cutting edge of the cutting knife. To adjust the anvil relative to the anvil carrier, it is only necessary to loosen the existing frictional connection, in particular screw connection or latching, so that the anvil can then be adjusted accordingly, in particular rotated around the longitudinal axis of the screw connection or latching. The embodiment of the non-positive connection, in particular the screw connection or latching with a defined pretensioning force, also allows the cutting device to be configured in a particularly simple and convenient manner in the further illustrated manner, according to which the cutting edge in the cutting position aligns the stop surface in a locationally fixed, in particular parallel, manner with respect to the cutting edge. The frictional connection, in particular the defined pretensioning force, is configured in such a way that an articulated adjustment can be effected via the force acting on the anvil via the cutting knife and the set position is then maintained via the frictional connection, in particular the pretensioning force, so that the anvil is in a fixed location relative to the cutting knife during further operation of the cutting device.

Particularly advantageously, the anvil in the operating position is connected to the anvil carrier in an articulated manner, in particular by means of a rotary joint, so that it can be adjusted against a spring force, in particular by using a spring element acting in the direction of the pretensioning force.

The advantageously provided fixing of the anvil to the anvil carrier in the operating position using a spring force, in particular a screw connection or latching of the anvil to the anvil carrier using a spring element acting in the direction of the pretensioning force of the screw connection or latching, makes it possible to ensure in a particularly simple and reliable manner that the anvil can be adjusted in an articulated manner on the anvil carrier in interaction with the cutting edge, in which case after the adjustment movement a particularly reliable stationary arrangement of the anvil on the anvil carrier in the position set by the cutting knife is ensured.

According to a further development of the present invention, there is further provision for the distance of the cutting edge from the stop surface in the rest position to be selected as required depending on the yarn thickness. Thus, in a preferred manner, the relative position or distance between the cutting edge and the anvil can be adjusted as required by changing the axial position of the anvil and/or the cutting edge as a function of the yarn thickness to be cut. In this way, it is possible to ensure reliably that a sufficient impulse is generated to separate the yarn.

The number of stop surfaces on the anvil is basically freely selectable. According to a particularly advantageous embodiment of the present invention, however, there is provision for the anvil to have four stop surfaces which are particularly preferably arranged uniformly distributed over the circumference of the anvil. Optionally, however, more than four stop surfaces can be provided. The number can be selected in such a way that reliable separation of the yarn can be ensured by the relative movement of the cutting knife in relation to the stop surface.

According to this embodiment of the present invention, the anvil is configured as a flat, polygonal, in particular rectangular, especially preferably square element, which has on its circumference four stop surfaces adjoining one another at an angle of essentially 90°. Alternatively, the anvil can also be configured as a pentagonal, hexagonal, etc. element. In the case of an advantageously articulated connection of the anvil to the anvil carrier, with the rotary axis extending in a preferred manner at a uniform distance from the stop surfaces through the centre of the anvil, the stop surface cooperating with the cutting edge can be selected by simply rotating the anvil by the appropriate angular amount, for example 90° for a square element, 60° for a hexagonal element. Overall, this embodiment of the present invention allows multiple changes of the stop surface that engages with the cutting edge. For example, a square element could be changed three times, and a hexagonal element could be changed five times, which means that longer service lives can be achieved.

According to a preferred embodiment of the present invention, there is provision for at least the stop surfaces of the anvil or the anvil forming the stop surfaces to have a 5% to 15% lower hardness compared to the cutting edge. This embodiment of the present invention ensures a particularly good service life of the cutting knife, with the resulting wear of the stop surface of the anvil being compensated for by the anvil having at least two, preferably at least four, stop surfaces, which are preferably arranged one after the other, for example after a certain wear limit has been reached, in the operating position opposite the cutting edge. Furthermore, according to a preferred embodiment, the cutting edge of the cutting knife can be replaceably arranged and attached to the cutting knife or the cutting knife with the cutting edge can be replaceably arranged and attached to a cutting knife carrier.

According to a particularly preferred embodiment of the present invention, there is provision for the anvil to be formed from a sintered material which permits a particularly simple and inexpensive production of the stop surfaces or the anvil with a desired degree of hardness. For example, the stop surfaces or the anvil forming the stop surfaces can be formed from a material such as the commercially known material FD-0205-HT.

According to a further preferred embodiment of the present invention, at least the cutting edge or the cutting knife forming the cutting edge is formed from a wear-resistant material with high hardness, the material having a content of at least 4% chromium and of at least 4% vanadium. Such materials are known, for example, by the commercial names ASP2009, ASP2011, ASP2030, Böhler S390, CMP V9, CMP V10, etc. The wear resistance of the cutting knife and consequently the service life can thus be improved.

According to a preferred embodiment of the present invention, at least the cutting edge or alternatively the cutting knife carrying the cutting edge in a locationally fixed manner relative to the cutting knife is freely rotatable about a rotary axis extending perpendicular to the centre axis of the cutting edge or the cutting knife by a defined angular amount relative to an adjustment movement axis of the adjustment movement of the cutting edge between the rest position and the cutting position. Preferably, the defined angle is between 0° to 15° inclusive, more preferably between 0° to 10° inclusive, and particularly preferably between 0° to 5° inclusive. The rotatable bearing can be realized by usual types of bearings causing a rotation. The bearing arrangement is particularly preferably configured to allow a rotary movement in a rotary movement plane by the defined angular amount on both sides of the adjustment movement axis of the cutting device. A type of hinge device is provided as a low-cost bearing variant, for example. The hinge device can preferably be formed by an engagement element and an engagement receptacle. For example, the engagement element can be of conical or frustoconical embodiment, the engagement receptacle having a first holding portion for receiving a section of the jacket surface of the conical or frustoconical engagement element and a second holding portion adjoining the first holding portion for receiving the free end portion of the engagement element. The limitation of the free rotational mobility can preferably be realised by the gap dimension defining the angular amount between mutually corresponding stop surfaces of the first holding portion and the jacket surface section to be arranged therein and/or of the second holding portion and the free end portion of the engagement element to be arranged therein. Further alternatively or in addition thereto, the cutting knife or the cutting edge can have an outer stop surface which, when the defined angular amount is reached, strikes against a counter stop surface to limit the rotational mobility.

The rotationally mobile mounting of at least the cutting edge or the cutting knife with the cutting edge allows the cutting edge to be aligned with the anvil, which can counteract the formation of burrs that impair cutting performance.

In accordance with another aspect of the present invention, a yarn clearer is proposed. It is characteristic of the yarn clearer according to the present invention, which can be arranged at a workstation of a textile machine, that it has a cutting device as described above according to the present invention or as further developed. The yarn clearer according to the present invention is characterised by its high cutting quality and long service life, during which no change of the anvil is required.

An embodiment example of the invention is explained with reference to the drawing. In the drawing:

FIG. 1 shows, in an exploded view, a perspective view of an embodiment of a cutting device.

FIG. 1 shows, in a perspective view, an embodiment of a cutting device 1 with an anvil 2 dismounted from an anvil carrier 7.

The cutting device 1 has a cutting knife drive 6, by means of which a cutting knife 4, which is interchangeably arranged on a cutting knife carrier 5, can be moved from a rest position, in which a cutting edge 20 is arranged at a distance from a stop surface 3 of the anvil 2, into a cutting position, not shown here, in which the cutting edge 20 rests against the stop surface 3 of the anvil 2.

In the embodiment example shown, the anvil 2 has a total of four stop surfaces 3 evenly distributed over the circumference, which make it possible to fix the anvil 2 in a total of four positions in an operating position on the anvil carrier 7. For this purpose, the anvil carrier 7 has a fastening section 18, on the upper side 19 of which the anvil 2 rests with an underside 17 in the operating position. To fix the anvil 2 to the fastening section 18, the latter has a threaded hole 8 which serves to receive a fastening screw 9 which, in the operating position, extends through a central through-bore 12 in the anvil 2 and is screwed into the threaded hole 8 by a threaded section 14.

In the operating positions of the anvil 2 set by the fastening screw 9 on the anvil carrier 7, a spring element 10 arranged coaxially with respect to the fastening screw 9 and formed by a spring ring abuts a shoulder 15 of the anvil 2 and a shoulder 11 extending adjacent to a coupling section 16 of the fastening screw 9. The pretensioning force which fixes the anvil 2 to the anvil carrier 7 and which can be generated via the fastening screw 8 can be adjusted via the spring element 10 in a particularly advantageous manner in such a way that, during a first adjustment of the cutting knife 4 into the cutting position, through the interaction of the cutting edge 20 with the anvil 2, the latter is adjusted about the longitudinal axis of the fastening screw 9 in such a way that the cutting edge 20 is aligned parallel to the stop surface 3. The pretensioning force is sufficient to subsequently fix the anvil 2 in the set position.

The cutting knife carrier 5 is mounted on the cutting knife drive 6 for defined rotary movement about the longitudinal axis of the fastening screw 9 via a hinge device 21. The hinge device 21 is formed from a receptacle 22 on the cutting knife carrier 5 and an engagement element, not shown, which is arranged on the cutting knife drive 6 and engages in the receptacle 22. The hinge device 21 permits a rotary movement of the cutting knife carrier 5 and thus of the cutting knife 4 or cutting edge 20 by a defined angular amount in a plane of rotation on either side of the adjustment movement axis of the cutting device 1.

LIST OF REFERENCE SIGNS

1 Cutting device
2 Anvil
3 Stop surface
4 Cutting knife
Cutting knife carrier
6 Cutting knife drive
7 Anvil carrier
8 Threaded hole

9 Fastening screw
10 Spring element
11 Shoulder
12 Through-bore
14 Threaded section
15 Shoulder
16 Coupling section
17 Underside
18 Fastening section
19 Upper side
20 Cutting edge
21 Hinge device
22 Receptacle

The invention claimed is:

1. A cutting device (1) for a yarn clearer, configured to be arranged at a workstation of a textile machine, comprising:
- a cutting knife (4) comprising a cutting edge (20),
  - wherein the cutting edge (20) is configured to be adjustable between a rest position and a cutting position; and
- an anvil (2), positioned on an anvil carrier (7),
  - wherein the anvil (2):
    - is positioned on the anvil carrier (7) in an operating position in which a stop surface (3) of the anvil (2) is configured to interact with the cutting edge (20) of the cutting knife (4) when the cutting edge (20) is in the cutting position,
    - comprises a polygonal shape having a plurality of stop surfaces (3) which are configured to be arranged on the anvil carrier (7) in the operating position, and
    - is configured to be adjustably arranged on the anvil carrier (7) in order to select which of the plurality of stop surfaces (3) is to be brought into an active connection with the cutting edge (20).

2. The cutting device (1) according to claim 1, wherein the anvil (2) is detachably positioned on the anvil carrier (7).

3. The cutting device (1) according to claim 1, wherein, when the anvil (2) is in the operating position and the cutting edge (20) is in the cutting position, the cutting edge (20) is configured to align the stop surface (3) in a fixed location with respect to the cutting edge (20).

4. The cutting device (1) according to claim 1, wherein the anvil (2) is connected to the anvil carrier (7) by a rotary joint configured to enable parallel alignment of the stop surface (3) with respect to the cutting edge (20), when the cutting edge (20) is in the cutting position.

5. The cutting device (1) according to claim 1, wherein the anvil (2), when in the operating position, is frictionally connected to the anvil carrier (7).

6. The cutting device (1) according to claim 1, wherein the anvil (2), when in the operating position, is connected to the anvil carrier (7) in an articulated manner so as to be adjustable against a spring force.

7. The cutting device (1) according to claim 1, wherein the cutting knife (4) or the cutting edge (20) is mounted so as to be freely rotatable about a rotary axis extending perpendicular to a center axis of the cutting edge (20) by a defined angular amount relative to an adjustment movement axis of an adjustment movement of the cutting edge (20) between the rest position and the cutting position.

8. The cutting device (1) according to claim 1, wherein the anvil (2) comprises four stop surfaces (3) evenly distributed over a circumference.

9. The cutting device (1) according to claim 8, wherein each stop surface (3) of the anvil (2) has a surface hardness that is 5% to 15% lower than a surface hardness of the cutting edge (20).

10. The cutting device (1) according to claim 1, wherein the cutting edge (20) comprises a wear-resistant material having a content of 4% chromium and of at least 4% vanadium.

11. The cutting device (1) according to claim 1, wherein the anvil (2) comprises a sintered material.

12. The cutting device (1) according to claim 5, wherein the anvil (2), when in the operating position, is screwed to the anvil carrier (7) with a defined pretensioning force.

13. The cutting device (1) according to claim 12, wherein the anvil (2) is screwed onto the anvil carrier (7) using a spring element (10) acting in a direction of the pretensioning force.

14. The cutting device (1) according to claim 6, wherein the articulated manner comprises a rotary joint.

15. A yarn clearer for a workstation of a textile machine with a cutting device (1) for clearing out defects from a yarn, wherein the cutting device (1) is configured according to claim 1.

* * * * *